United States Patent
Gupta

(10) Patent No.: US 9,107,043 B2
(45) Date of Patent: Aug. 11, 2015

(54) DETERMINING COORDINATES OF ACCESS POINTS IN AN INDOOR POSITION LOCATION SYSTEM

(71) Applicant: QUALCOMM Incorporated, San Diego, CA (US)

(72) Inventor: Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/042,442

(22) Filed: Sep. 30, 2013

(65) Prior Publication Data

US 2015/0094081 A1 Apr. 2, 2015

(51) Int. Cl.
  *H04W 24/00* (2009.01)
  *H04W 4/04* (2009.01)
  *H04W 64/00* (2009.01)
  *G01S 5/00* (2006.01)

(52) U.S. Cl.
  CPC .............. *H04W 4/04* (2013.01); *H04W 64/00* (2013.01); *G01S 5/00* (2013.01)

(58) Field of Classification Search
  CPC ........ H04W 4/04; H04W 4/043; H04W 4/046
  See application file for complete search history.

(56) References Cited

U.S. PATENT DOCUMENTS

| | | | |
|---|---|---|---|
| 6,748,224 B1 * | 6/2004 | Chen et al. | 455/456.1 |
| 7,224,984 B2 | 5/2007 | Agrawala et al. | |
| 2006/0125631 A1 * | 6/2006 | Sharony | 340/539.13 |
| 2007/0077945 A1 * | 4/2007 | Sheynblat | 455/456.5 |
| 2007/0217379 A1 | 9/2007 | Fujiwara et al. | |
| 2008/0167051 A1 * | 7/2008 | Cheok et al. | 455/456.5 |
| 2008/0261622 A1 * | 10/2008 | Lee et al. | 455/456.2 |
| 2010/0277285 A1 * | 11/2010 | Anderson et al. | 340/10.4 |
| 2011/0221635 A1 | 9/2011 | Wang | |
| 2012/0056900 A1 * | 3/2012 | Park et al. | 345/653 |
| 2012/0129559 A1 | 5/2012 | Pochop, Jr. | |

(Continued)

FOREIGN PATENT DOCUMENTS

EP 2327996 A1 6/2011
WO WO 2012/032724 * 3/2012 ............ H04W 64/00

OTHER PUBLICATIONS

Bachrach et al., Chapter 9: Localization in Sensor Networks, Handbook of Sensor Networks, Algorithms and Architectures edited by Ivan Stojmenovic, 2005, John Wiley & Sons, Inc., pp. 277-310.

(Continued)

*Primary Examiner* — Ronald Eisner
(74) *Attorney, Agent, or Firm* — Holland & Hart LLP

(57) ABSTRACT

Methods, systems, and devices are described for determining and updating coordinates of access points (APs) within a location tracking system. Tools and techniques are described that may provide for automatically determining a coordinate set, which represents coordinates of at least three neighboring APs within a location tracking area. These techniques may be utilized at the time of the APs' deployment and/or when APs are moved or relocated to a new location. The methods, systems, and devices may be applicable to single- and multi-floor location tracking systems. Coordinate and/or coordinate sets of APs may be stored in a location tracking server, and they may used in determining a location of tracking tags with the location tracking area. The stored coordinates and/or coordinate sets may be updated as the location of APs change.

22 Claims, 12 Drawing Sheets

(56) References Cited

U.S. PATENT DOCUMENTS

2012/0326923 A1 12/2012 Oehler et al.
2013/0102324 A1 4/2013 Qiu et al.

OTHER PUBLICATIONS

Shang et al., Improved MDS-Based Localization, INFOCOM 2004, Twenty-third Annual Joint Conference of the IEEE Computer and Communications Societies, Mar. 7-11, 2004, pp. 2640-2651, vol. 4, 0-7803-8356-7-04, IEEE.

ISA/EPO, International Search Report and Written Opinion of the International Searching Authority, Int'l App. No. PCT/US2014/056748, Apr. 7, 2015, European Patent Office, Rijswijk, NL 13 pgs.
Priyantha et al., "Mobile-Assisted Localization in Wireless Sensor Networks," INFOCOM 2005, 24th Annual Joint Conference of the IEEE Computer and Communications Societies, Proceedings IEEE, Mar. 13-17, 2005, pp. 172-183, vol. 1, Institute of Electrical and Electronics Engineers.

* cited by examiner

DETERMINING COORDINATES OF ACCESS POINTS IN AN INDOOR POSITION LOCATION SYSTEM

BACKGROUND

In some settings, such as in indoor and enterprise environments, it may be important to easily locate various types of assets or people, or both. Examples of such settings include hospitals, retail stores, warehouses, etc. The accuracy and speed with which the location of assets or people is monitored in an indoor setting may be an important factor in determining the usefulness of the tracking system. In addition, having a tracking system that is cost effective, scalable, and that can provide continuous, accurate, and precise location monitoring is also desirable.

Different systems and devices may be used to locate assets and/or people in a particular indoor environment. An ultra-wideband (UWB) network, or some other radio frequency network deployed throughout at least a portion of the indoor environment, may be configured to perform indoor tracking. Systems may employ multiple access points (APs) placed at specific locations in the indoor environment. A location tracking tag also may be attached to each mobile asset and/or to each person to be tracked. The tag may send waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person to which the tag is attached.

In order for the tags to be tracked accurately, it is desirable to know a specific location of the surrounding APs. The location of an AP may be more difficult to determine if an AP is moved or relocated or if a new AP is placed into the location tracking system. Furthermore, it is desirable for the access points to be able to determine their location independently through the use of at least two nearby access points and/or a tracking management server.

SUMMARY

Described below are methods, systems, and/or devices that provide for automatically determining coordinates of access points (APs) within a tracking area of a position location network. The methods, systems, and/or devices may include tools and techniques that provide for automatically determining a coordinate set, which represents coordinates of at least three neighboring APs within the tracking area. These techniques may be utilized at the time of the APs' deployment and/or when APs are moved or relocated to a new location.

Once the coordinates of one AP are ascertained, and the distance between that AP and one or more of its neighbors is established, the unknown coordinates of remaining APs within a tracking area may be calculated and transmitted as coordinate sets to a location tracking server. Distances between any neighboring pair of APs may be calculated by two-way ranging. The coordinates of each AP may be calculated from known values and/or values measurable by the APs. The coordinates may be defined with respect to one or more axis. For APs having the same elevation, coordinates may be defined for two dimensions. In cases where elevation between APs differ, coordinates may be defined for three dimensions.

A method of calibrating a position location network is described. At least a first access point (AP), a second AP, and a third AP may be identified in a tracking area. A coordinate system may be defined with the first AP at an origin and the second AP on an axis. A first distance between the first AP and the second AP may be received. A second distance between the second AP and the third AP may be received. A third distance between the first AP and the third AP may be received. A coordinate set may be calculated. The coordinate set may include coordinates for the second AP and the third AP. The coordinate set may be based at least in part on the defined coordinate system and the received first, second, and third distances.

In one embodiment, an additional AP may be iteratively identified. A first additional distance between the additional AP and a first neighbor AP having determined coordinates may be received. A second additional distance between the additional AP and a second neighbor AP having determined coordinates may be received. Coordinates for the additional AP may be calculated. The coordinates for the additional AP may be based at least in part on the received first and second additional distances and the coordinates for the first and second neighbor APs.

In one example, the coordinate set may be updated with the coordinates for the additional AP. The coordinate set may be utilized to determine a location of a tag. The first and second neighbor APs may include two APs nearest the additional AP.

In one configuration, a fourth AP may be identified. A fourth distance between the fourth AP and a first neighbor AP having determined coordinates may be received. A fifth distance between the fourth AP and a second neighbor AP having determined coordinates may be received. Coordinates may be calculated for the fourth AP. The coordinates for the fourth AP may be based at least in part on the received fourth and fifth distances and the coordinates for the first and second neighbor APs.

In one embodiment, coordinates for a fifth AP may be calculated. The coordinates for the fifth AP may be based at least in part on coordinates for the fourth AP. The first and second neighbor APs may include the second and third APs. The coordinates may be rectangular coordinates. The coordinates may be cubic coordinates.

In one example, the first distance may be calculated. Calculating the first distance may include a first ranging operation between the first AP and the second AP. The second distance may be caldulated. Calculating the second distance may include a second ranging operation between the second AP and the third AP. The third distance may be calculated. Calculating the third distance may include a third ranging operation between the first AP and third AP. The first ranging operation, the second ranging operation, and the third ranging operation may include ultra-wideband (UWB) transmissions.

A system configured for calibrating a position location network is also described. The system may include means for identifying at least a first access point (AP), a second AP, and a third AP in a tracking area, means for defining a coordinate system with the first AP at an origin and the second AP on an axis, means for receiving a first distance between the first AP and the second AP, means for receiving a second distance between the second AP and the third AP, means for receiving a third distance between the first AP and the third AP, and means for calculating a coordinate set comprising coordinates for the second AP and the third AP. The coordinate set may be based at least in part on the defined coordinate system and the received first, second, and third distances.

An apparatus for calibrating a position location network is also described. The apparatus may include a processor and memory in electronic communication with the processor. Instructions may be stored in the memory. The instructions may be executable by the processor to identify at least a first access point (AP), a second AP, and a third AP in a tracking area, define a coordinate system with the first AP at an origin and the second AP on an axis, receive a first distance between the first AP and the second AP, receive a second distance between the second AP and the third AP, receive a third distance between the first AP and the third AP, and calculate a coordinate set comprising coordinates for the second AP and the third AP. The coordinate set may be based at least in part on the defined coordinate system and the received first, second, and third distances.

A computer-program product for calibrating a position location network is also described. The computer-program product may include a non-transitory computer-readable medium storing instructions executable by a processor to identify at least a first access point (AP), a second AP, and a third AP in a tracking area, define a coordinate system with the first AP at an origin and the second AP on an axis, receive a first distance between the first AP and the second AP, receive a second distance between the second AP and the third AP, receive a third distance between the first AP and the third AP, and calculate a coordinate set comprising coordinates for the second AP and the third AP. The coordinate set may be based at least in part on the defined coordinate system and the received first, second, and third distances.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described that address issues pertaining to automatically determining coordinates of access points within a tracking area of a position location network (or system). The methods, systems, and/or devices may include tools and techniques that provide for automatically determining a coordinate set, which represents coordinates of three neighboring access points within the tracking area. The described techniques may be utilized at the time the access points are deployed and/or when access points are moved or relocated to a different location.

One way to acquire the coordinates of access points (APs) within a location tracking system is to place the APs in some regular or quasi-regular pattern throughout the floor of a building. Their general location may then be derived from the pattern and the floor plan of the building, which can be time consuming as well as prone to errors and limited accuracy. Furthermore, if an AP needs to be moved or relocated, then its new coordinates may need to be obtained and the system may need to be updated with the new coordinates.

Therefore, it may be beneficial to have a location tracking network where the APs may determine their location relative to the other APs of the network. Determining an AP location may involve an initial two APs that are used to define a plane, including a set of axis, for the rest of the APs to populate. From there a two-way ranging operation between any two APs with known coordinates and each subsequent AP may allow for the coordinates of all subsequent APs to be determined. The distances from the two-way ranging operations may be transmitted to a location tracking server which may calculate coordinates. In some cases, the location tracking server maintains a database with the current locations of the APs within the tracking network. Once the location of the APs within the network are accurately known, the system may provide for accurate and reliable tracking of tag units within the location tracking network.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
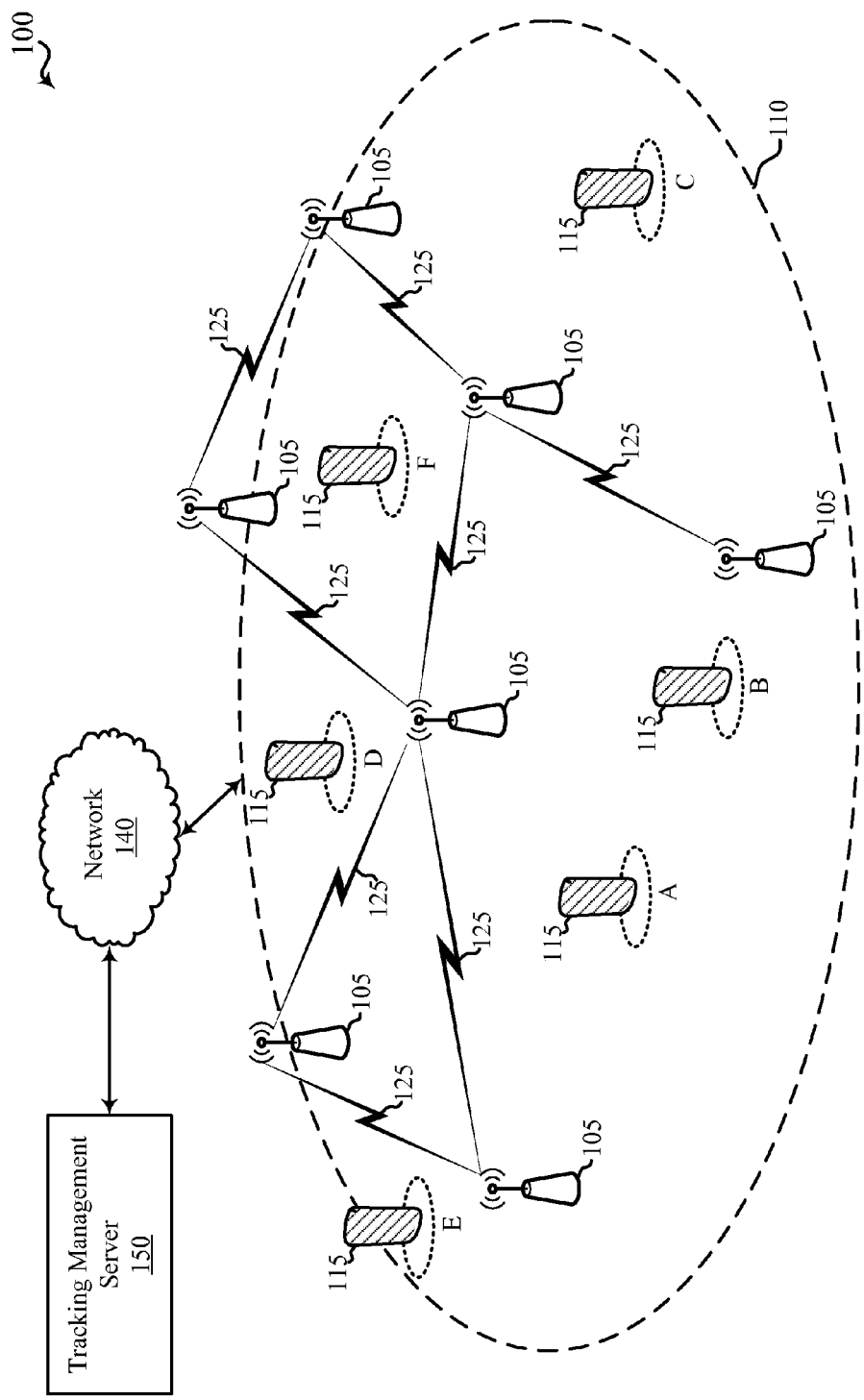
FIGS. 1A and 1B show an example(s) of a location tracking system in accordance with various embodiments.

First, FIG. 1A depicts an example of a location tracking system 100 in accordance with various embodiments. The system 100 provides location tracking of assets (e.g., objects) or people, or both, throughout the coverage area 110 associated with an indoor and/or enterprise environment. In some embodiments, the coverage area 110 represents an area of coverage inside a building, such as a hospital, a retail store, or a warehouse. Within the coverage area 110, multiple APs 105 may be deployed at specific locations, as may multiple tags (also known as tag unit and location tracking tags) 115, which may be tracked within the coverage area 110. Because of their stationary nature, the exact distance between any two APs 105 is typically known, or may be determined, throughout the operation of the system 100. Any two APs 105 may ascertain the distance between themselves through a ranging operation, which may be a two-way ranging operation. The ranging operation may be performed via communication links 125.

The arrangement of APs 105 shown in FIG. 1A is intended as a non-limiting example. The APs 105 may be deployed or distributed within the coverage area 110 in a manner or pattern different from that depicted in FIG. 1A. For example, the APs 105 may be arranged at different distances form one another. In some cases, the coverage area 110 may represent a two-dimensional deployment, such as a single floor within a building. But in some embodiments, the APs 105 are deployed in a three-dimensional manner by placing some of the APs 105 on different floors or levels of a building within the coverage area 110.

Each of the APs 105 may be equipped with a narrowband transceiver or a UWB transceiver, or both. Additionally or alternatively, the APs 105 may include one or more oscillators or timers, or both. The oscillators may each produce a repetitive, oscillating electronic signal, which may be adjustable and/or variable. The oscillators may be RF oscillators. The oscillators may be linear- or relaxation-type. In some embodiments, the oscillators are voltage controlled, temperature compensated crystal oscillators (VCTCXO). The timers may include quartz clock(s), they may be digital, and/or they may be implemented in software or as a counter in hardware.

The APs 105 may need to undergo a calibration procedure in order to increase the precision and/or accuracy of the tracking system 100. Calibration may include synchronizing the APs 105 to one another, to a network 140, and/or to a tracking management server 150. Additionally or alternatively, calibration may include determining coordinates of each AP 105.

In some cases, one or more APs 105 are designated or selected as master APs or acting master APs that facilitate synchronization. Network-wide synchronization of APs 105 may involve designating or selecting a master AP 105 with a stable oscillator and stable timer. Each of the other APs 105 may synchronize their respective oscillators and timers to the master AP or to an acting master AP. This synchronization may include coarse and fine synchronization steps, which, in some embodiments, involves receiving and transmitting both narrowband and UWB signals.

Calibration may also include determining the coordinates of each of the APs 105 within the coverage area 110. Coordinates of each of the APs 105 may be determined incrementally, based on known coordinates of one of the APs 105 and known or determined distances between APs 105.

Each of the tag units 115 may be attached to an asset of person being tracked within the coverage area 110. The tag units 115 may be equipped with a narrowband transceiver or a UWB transceiver, or both. The tag units 115 may also have one or more oscillators or timers, or both. The oscillators may each produce a repetitive, oscillating electronic signal, which may be adjustable and/or variable. The oscillators may be RF oscillators. The oscillators may be linear- or relaxation-type. By way of example, the oscillators are VCTCXO. The timers may include quartz clock(s), they may be digital, and/or they may be implemented in software or as a counter in hardware.

FIG. 1A depicts an example location tracking system 100 with six tag units at locations A, B, C, D, E, and F. Over time, these locations may change as the assets or people to which the tags 115 are attached move or are moved within the coverage area 110. The system 100, shown with six tags 115, is intended as a non-limiting example of a location tracking system. Those skilled in the art will recognize that the system 100 is scalable, and it may be capable of tracking more or fewer assets or people.

The system 100 includes a tracking management server 150, which also may be referred to as a tag tracking management server. In some embodiments, the tracking management server 150 is connected to the APs 105 through a network 140. The connection may be by way of a radio network associated with the APs 105. The tracking management server 150 may receive information from the APs 105 to perform various types of calculations, including: determining one or more sets of receive filters for the APs 105; detecting whether a tag 115 is mobile or stationary and adjusting update rates accordingly; estimating characteristics of communication channels; and/or estimating a location of an asset or person being tracked within the coverage area 110. The tracking management server 150 may also schedule or coordinate various operations associated with the APs 105, including when to have an AP 105 wirelessly communicate (e.g., when to transmit UWB and/or narrowband signals) with other APs 105 or with tags 115. In some embodiments, the tracking management server 150 stores information about different APs 105 and subsets of APs 105; and it may use stored information to schedule or coordinate various operations between individual APs 105 and/or subsets of APs 105.

The APs 105 may communicate with one another by sending and/or receiving UWB signals and/or narrowband signals. The channels between APs 105, which are associated with communication links 125, are often characterized by noise and signal-degrading impedances. It may therefore be beneficial to maximize the signal transmit power.

Figure 1B:
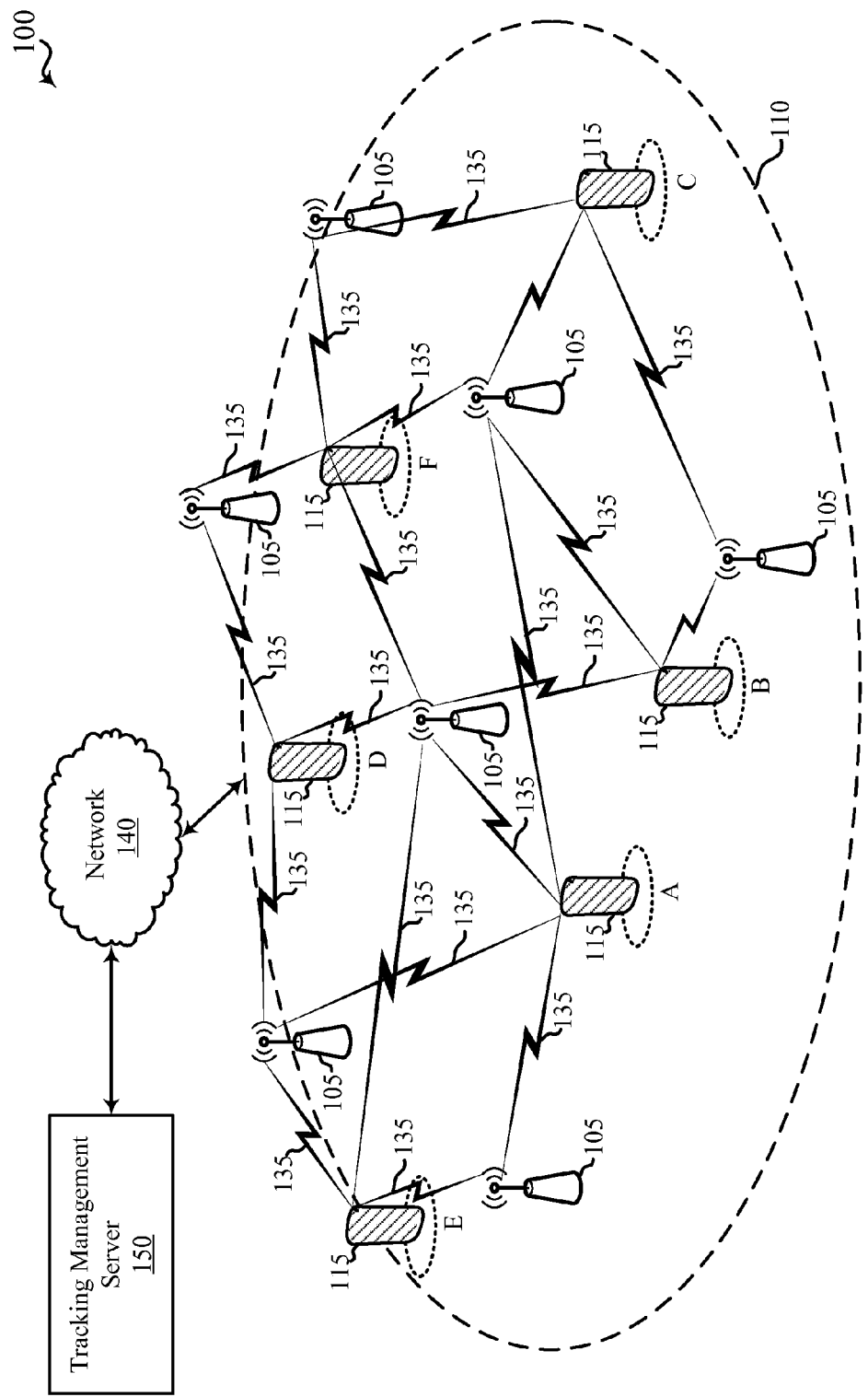

FIG. 1B illustrates transmissions or broadcasts between APs 105 and tags 115 via communication links 135. In some embodiments, the tags 115 communicate with APs 105 via the communication links 135 using either or both UWB and narrowband signals. Whether a tag 115 communicates primarily with narrowband or UWB may be a function of whether the tag 115 is mobile or stationary.

An AP 105 may communicate with other APs 105 using either or both UWB and narrowband signals. During this communication a first AP 105 may establish an orientation with a second AP 105. This orientation may be used to determine the location and/or coordinates of subsequent APs 105. The orientation may be determined only based on the first AP 105 and the second AP 105, or the orientation may be further based on outside factors such as a compass or longitude and/or latitude values. In some embodiments, the first AP 105 determines a first distance between itself and the second AP 105; and one of the APs 105 transmits the distance to the tracking management server 150. The tracking management server 150 may define a coordinate system (e.g., establish a set of axes) and further may calculate a coordinate set, whether rectangular or cubic, of the APs 105 within the tracking area.

Other distances may be calculated by the APs 105 and transmitted to the tracking management server 150. For example, a second distance between the second AP 105 and a third AP 105, a third distance between the first AP 105 and the third AP 105, a fourth distance between the first AP 105 and a fourth AP 105, and a fifth distance between the second AP 105 and the fourth AP 105. These distances may be used with the defined coordinate system and the first distance to calculate coordinates of the various APs 105.

The tracking management server may perform the distance and/or orientation calculations based on data provided to it from the APs 105. In some cases, the tracking management server 150 determines the two closest APs 105, with previously determined coordinates, to use to determine the location of an AP 105. In some embodiments, a previous set of coordinates stored at the tracking management server is updated when the set of coordinates is transmitted to the tracking management server 150.

Figure 2A:
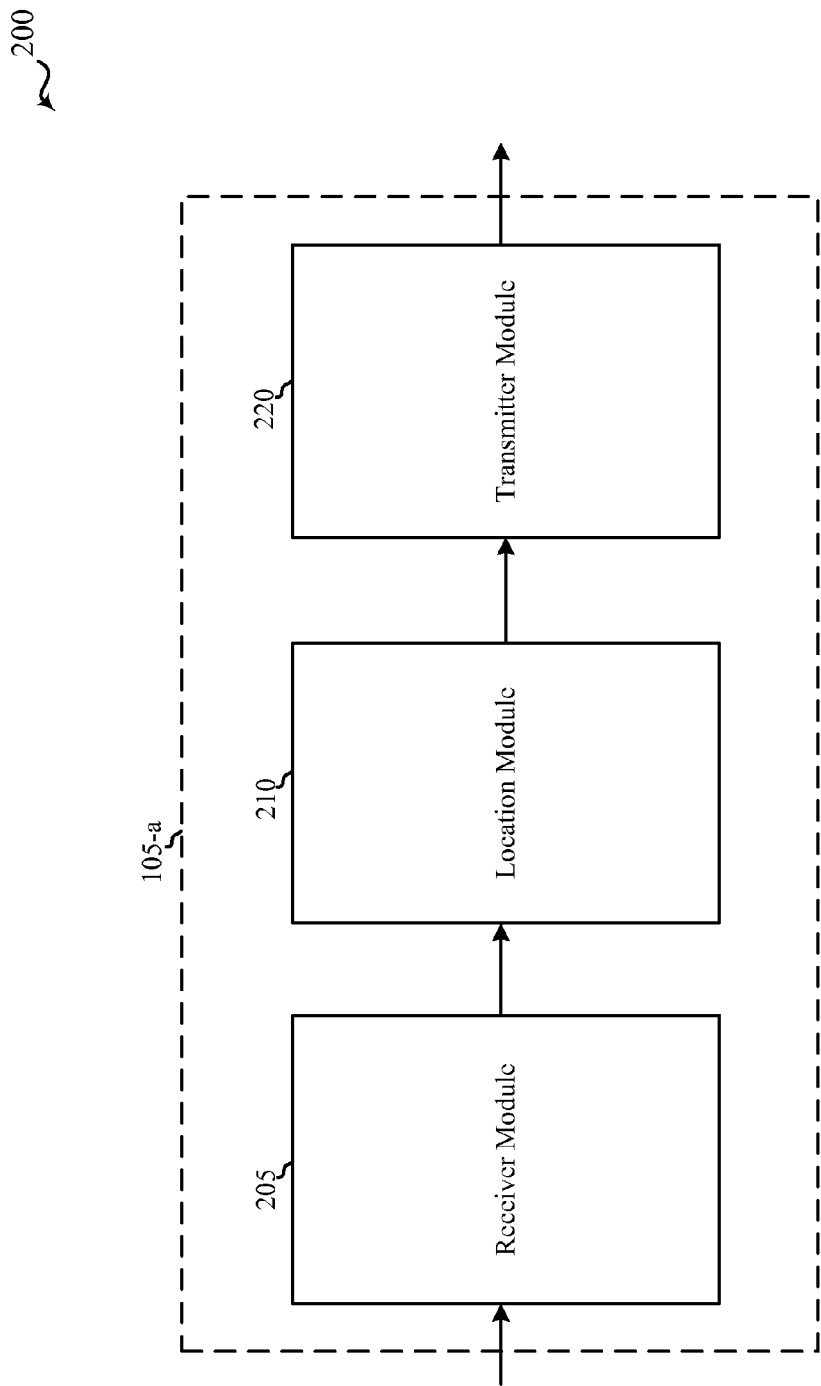
FIGS. 2A and 2B show block diagrams of an example device(s) that may be employed in location tracking systems in accordance with various embodiments.

Next, turning to FIG. 2A, a block diagram 200 illustrates a device 105-a configured for calibrating a position location network in accordance with various embodiments. The device may be an example of an AP 105-a, which may be an example of an AP 105 of FIG. 1A or FIG. 1B, or both. The device 105-a may also be a processor. The device may include a receiver module 205, a transmitter module 220, and/or a transceiver module. The receiver module 205 and/or transmitter module 220 may include an integrated processor. They may also include an oscillator and/or a timer. In some embodiments, the receiver module 205 and the transmitter module 220 are a part of a UWB transceiver module, a narrowband transceiver module, or both.

The device 105-a may also include a location module 210. The location module 210 may include an integrated processor. It may also include an oscillator and/or a timer. The location module 210 may determine a distance between two APs. Further, the location module 210 may determine an orientation of a second AP with respect to a first AP.

In some embodiments, the components of the device 105-a are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

By way of illustration, the device 105-a, through the receiver module 205, the location module 210, and the transmitter module 220, may transmit a ranging signal to a second AP. The second AP may receive the ranging signal with the receiver module 210 before using the location module 210 to determine a distance between the two devices. A return signal or a signal relating to the distance may then be sent using the transmitter module 220 to the first device.

Figure 2B:
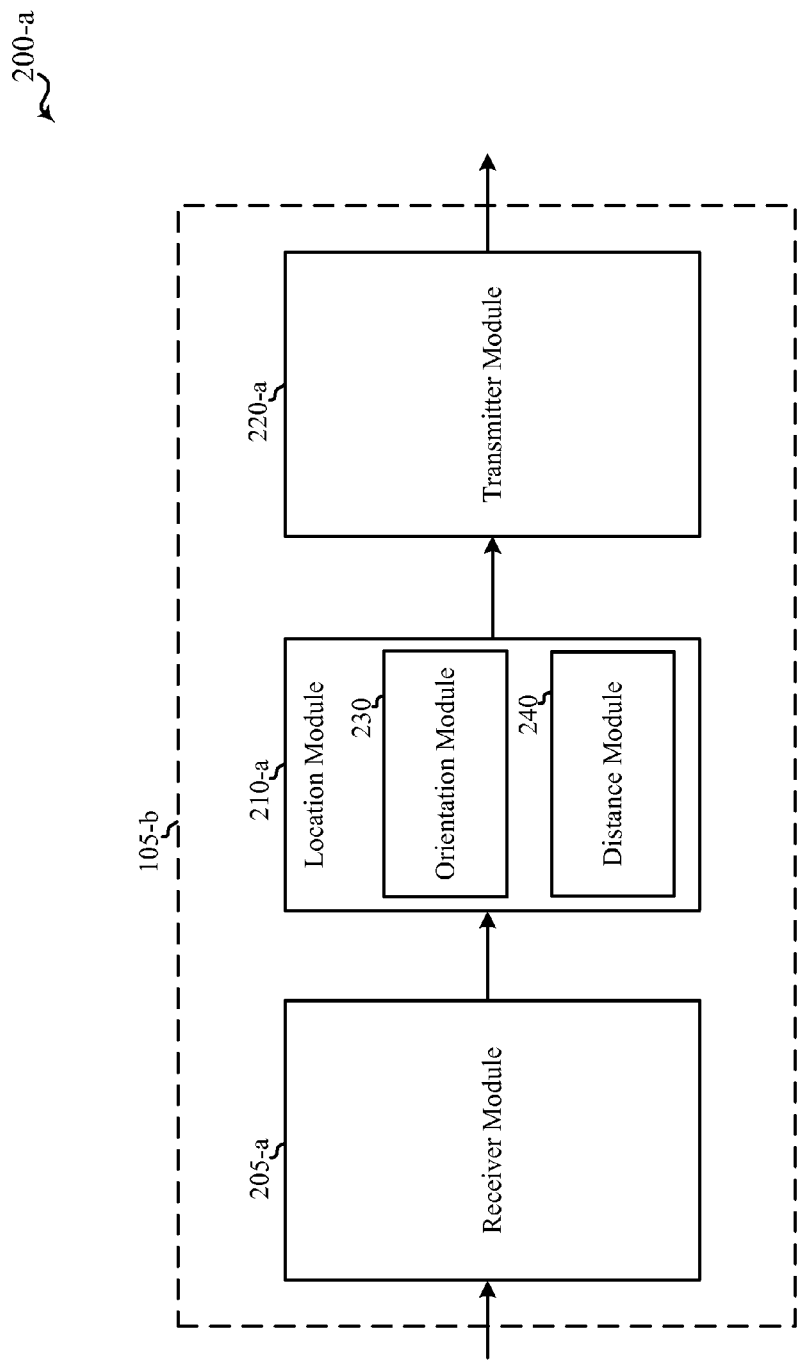

Next, FIG. 2B shows a block diagram 200-a of a device 105-a configured for calibrating a position location network in accordance with various embodiments. The device 105-b may be an example of the device 105-a of FIG. 2A; and the device 105-b may perform the same or similar functions as described above for device 105-a. In some embodiments, the device is an AP 105-a, which may include one or more aspects of the APs 105 described above with reference to any or all of FIGS. 1A, 1B, and 2A. The device 105-b may also be a processor. In some cases, the device includes a receiver module 205-a, which may be an example of the receiver module 205 of FIG. 2A; and the receiver module 205-a may perform the same or similar functions as described above for receiver module 205. In some cases, the device 105-b includes a transmitter module 220-a, which may be an example of the transmitter module 220 of FIG. 2A; and the transmitter module 220-a may perform the same or similar functions as described above for transmitter module 220.

The device may include a location module 210-a, which may be an example of the location module 210 of FIG. 2A. The location module 210-a may determine a distance between two APs and/or may determine an orientation of a second device with respect to a first device. In some embodiments, the location module includes an orientation module 230 and/or a distance module 240.

In some embodiments, the device includes the orientation module 230. The orientation module 230 may determine an orientation of a second device relative to the device. When determining the orientation, the orientation module 230 may establish a set of axes, such as for a Cartesian coordinate system, a polar coordinate system, a cylindrical coordinate system, or a spherical coordinate system, based at least in part on the first device 200-a and the second device. In an embodiment, the orientation is determined by defining the first device 200-a as an origin for the set of axis. Further, an axis, such as an x-axis, may be defined as running from the origin, or the first device 200-a, through the second device. Therefore, the second device may be defined to be located at a position along an axis, such as at (x, 0), where x is a distance to be determined. Once an orientation, and as such a coordinate system set of axes, is determined the location of subsequent devices, such as APs 105 and/or tag units 115, may use the orientation to define their position within the location tracking network.

In some embodiments, the device includes the distance module 240. The distance module 240 may determine a distance of the second device from the first device 200-a. In some cases, calculating a distance is performed using at least one radio frequency (RF) transmitter, such as but not limited to an UWB transceiver and/or a narrowband transceiver. The distance may be calculated using any currently known, or future known, ranging techniques, such as but not limited to a time of flight, a time offset, and/or a frequency offset calculation. Once a distance is determined between the device 105-b and the second device, a precise location of the second device may be defined within the coordinate system as $(d_1, 0)$, where $d_1$ is the distance calculated by the distance module 240 between the device 105-b and the second device. With the device 105-b and the second device located at known coordinates, subsequent devices, such as APs 105 and/or tag units 115, may be accurately located within the coordinate system based on their distance from the device 105-b and the second device, as calculated by the distance module 240. In some cases, the distance module 240 determines the two closest APs 105, with previously determined coordinates, to use to determine the location of an AP 105.

According to some embodiments, the components of the device are, individually or collectively, implemented with one or more ASICs adapted to perform some or all of the applicable functions in hardware. In other embodiments, the functions of device are performed by one or more processing units (or cores), on one or more integrated circuits. In other embodiments, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 3:
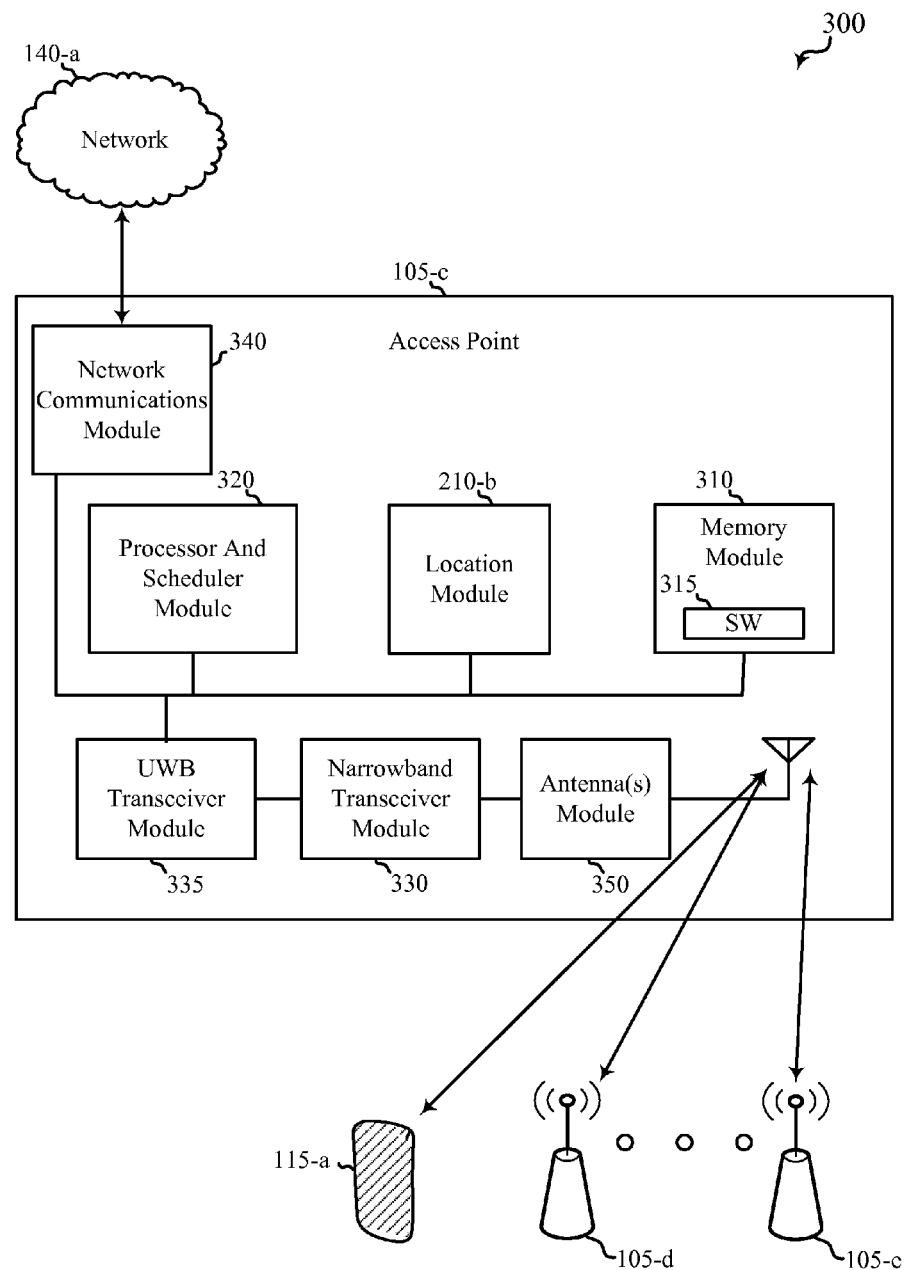
FIG. 3 shows a block diagram of an example of a location tracking system in accordance with various embodiments.

Turning now to FIG. 3, which depicts a block diagram of a system 300 configured for calibrating a position location network in accordance with various embodiments. The system 300 may include an APs 105-c, 105-d, and 105-e, which may be examples of the APs 105 described with reference to one or more of FIGS. 1A, 1B, 2A, and 2B. The AP 105-c may include a memory module 310, which, in some embodiments, includes a software module 315. The AP 105-c may include a processor and scheduler module 320, an UWB transceiver module 335, a narrowband transceiver module 330, antenna(s) module 350, a network communications module 340, and a location module 210-b. Each of the components of the AP 105-c may be in communication with each other. The network communications module 340 may be in communication with the network 140-a, which may be an example of the network 140 of FIGS. 1A and 1B.

The memory module 310 may include random access memory (RAM) and read-only memory (ROM). In some embodiments, the memory module 310 also stores computer-readable, computer executable software (SW) code 315 containing instructions configured to, when executed, cause the processor and scheduler module 320 to perform various functions described herein related to calibrating a position location network. In other embodiments, the software (SW) code 315 may not be directly executable by the processor and scheduler module 320; but it may be configured to cause a computer, e.g., when compiled and executed, to perform the functions described herein.

The processor and scheduler module 320 may include an intelligent hardware device, such as a central processing unit (CPU). The processor and scheduler module 320 may perform various operations associated with calibrating a position location network. The processor and scheduler module 320 may use scheduling information received from, for example, the tracking management server 150, by way of the network 140-*a*, to determine locations of devices, such as APs 105 or tag units 115, within a location tracking network. The processor and scheduler module 320 may perform various operations associated with calibrating a position location network, including determining when to update the locations of APs 105 within the location tracking network.

In some embodiments, the AP 105-*c* also includes an ultra wideband transceiver module 335. The system may also include an oscillator (not shown), which may be connected to the UWB transceiver module 335. The UWB transceiver module may include an UWB modulator and a radio frequency (RF) transceiver. In some embodiments, the UWB transceiver module 335 includes, or is in communication with, a timer. The UWB transceiver module 335 may include an integrated processor. The UWB transceiver module 335 may work with, or for, the location module 210-*b* to determine distances between, for example, different APs.

The system 300 may further include the narrowband transceiver module 330. The narrowband transceiver module 330 may include an integrated processor. It may also include a timer. The narrowband transceiver module 330 may be capable of communicating with wireless local area network (WLAN) products that are based on the IEEE 802.11 family of standards (WiFi). In some embodiments, the narrowband transceiver module 330 is a two-way digital radio based on the IEEE 802.15 family of standards (ZigBee). In another embodiment, the narrowband transceiver module 330 is a two-way digital radio based on the IEEE 802.15.1 family of standards, such as Bluetooth.

Either or both of the UWB transceiver module 335 and narrowband transceiver module 330 may include a modem configured to modulate data (e.g., packets) and provide the modulated data to the antenna(s) module 350 for transmission, and to demodulate data received from the antenna(s) module 350. Some embodiments of the AP 105-*c* include a single antenna; other embodiments include multiple antennas. As shown in FIG. 3, signals transmitted from a tag 115-*a* may be transmitted or received, or both, by the AP 105-*c* via the antenna(s) in the antenna(s) module 350. The AP 105-*c* may also wireless communicate with other APs, such as APs 105-*d* through 105-*e*. In some embodiments, the AP 105-*c* may receive signals, including UWB, narrowband, and reference signals from other APs 105; and the AP 105-*c* may use the received signals for calibrating, synchronizing, and/or determining a location of a tag unit 115 and/or an AP 105. In some cases, the AP 105-*c* may transmit received signals to the tracking management server 150 via the network communications module 340 and the network 140-*a*.

In some embodiments, the location module 210-*b* performs substantially the same functions as the location module 210 described with reference to FIGS. 2A and 2B. For example, the location module 210-*b* may determine a distance between the AP 105-*c* and one or more other APs, such as APs 105-*d* and 105-*e*. In some cases, the location module 210-*b* may determine an orientation of a second AP 105 with respect to the AP 105-*c*, which may be used to define a coordinate system.

Figure 4:
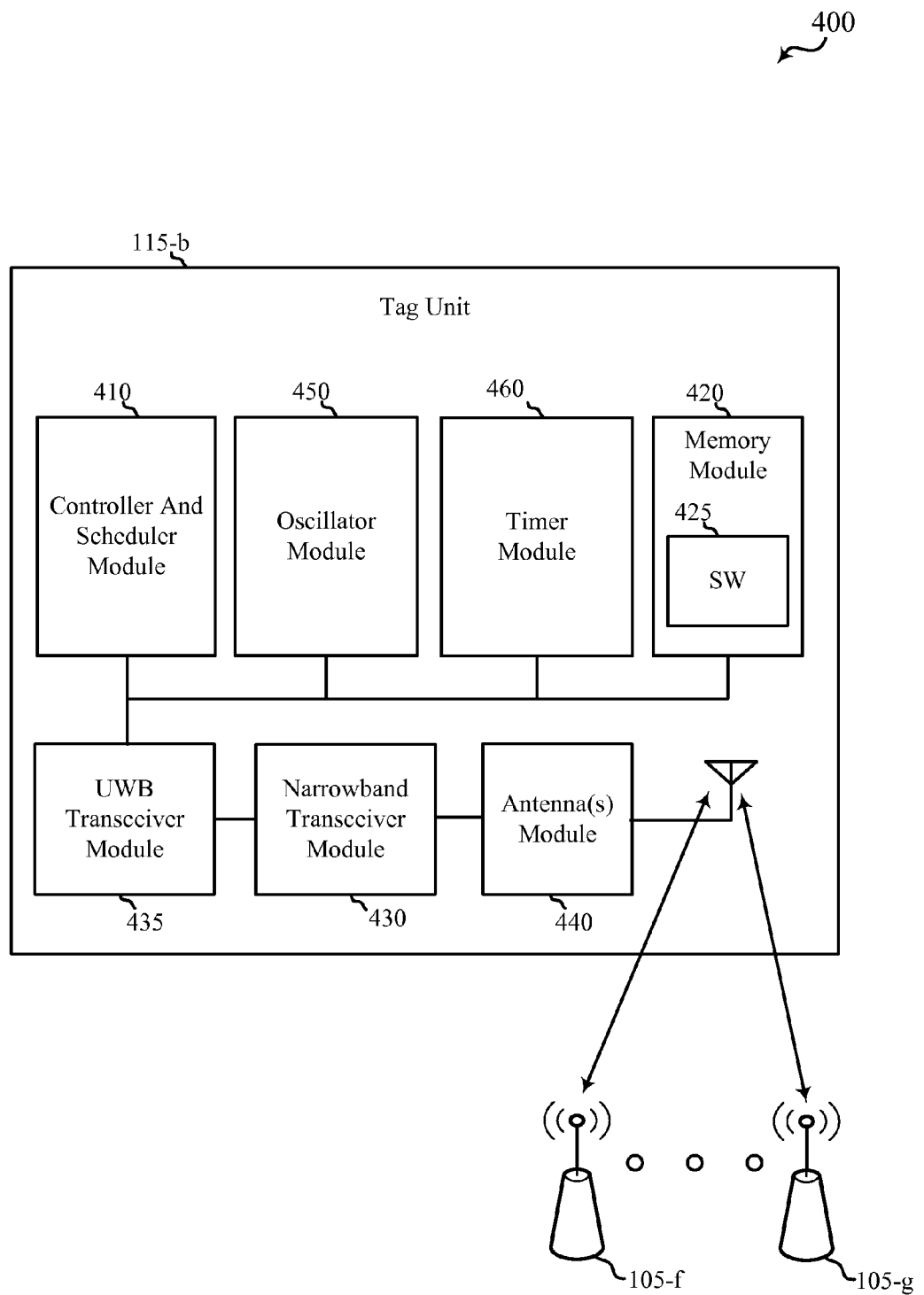
FIG. 4 shows a block diagram of an example of a location tracking system in accordance with various embodiments.

Next, FIG. 4 shows a block diagram illustrating a system 400 configured for calibrating a position location network, which may include a tag unit 115-*b*. In some embodiments, the tag unit 115-*b* includes one or more aspects of the tag units 115 of any or all of FIGS. 1A, 1B, 2A, 2B, and 3. The tag unit 115-*b* may include a controller and scheduler module 410, a memory module 420, a UWB transceiver module 435, a narrowband transceiver module 430, and antenna(s) module 440. In some embodiments, the tag unit 115-*b* includes an oscillator module 450 or a timer module 460, or both. The oscillator module 450 and the timer module 460 may each include several oscillators and timers, respectively.

By way of illustration, the controller and scheduler module 410 includes logic or code, or both, that enables it to control the operations of the tag unit 115-*b*. In some cases, the controller and scheduler module 410 includes a microcontroller or a state machine to control the UWB transceiver module 435 and the narrowband transceiver module 430.

The memory module 420 may include random access memory (RAM) or read-only memory (ROM), or both. In some embodiments, the memory module 420 stores computer-readable, computer-executable software (SW) code 425 containing instructions that are configurable to, when executed, cause the controller and scheduler module 410 to perform various functions described herein for controlling the tag unit 115-*b*. In other embodiments, the software code 425 is not directly executable by the controller and scheduler module 410, but it may be configured to cause a computer, for example, when compiled and executed, to perform functions described herein.

The UWB transceiver module 435 may support radio frequency (RF) communication technology to broadcast UWB signals through the antenna(s) module 440. Likewise, the narrowband transceiver module 430 may support RF communication technology to broadcast narrowband signals through the antenna(s) module 440. In some embodiments, the UWB transceiver module 435 or the narrowband transceiver module 430, or both, include a modulator (not shown) to modulate location tracking information and provide the modulated information to the antenna(s) module 440 for transmission of signals. FIG. 4 shows broadcast and reception of signals between the tag unit 115-*b* and several APs 105. In the system 400, at least two APs 105-*f* and 105-*g* are shown communicating with the tag unit 115-*b*; but the tag unit 115-*b* may communicate with more or fewer APs 105.

Figure 5:
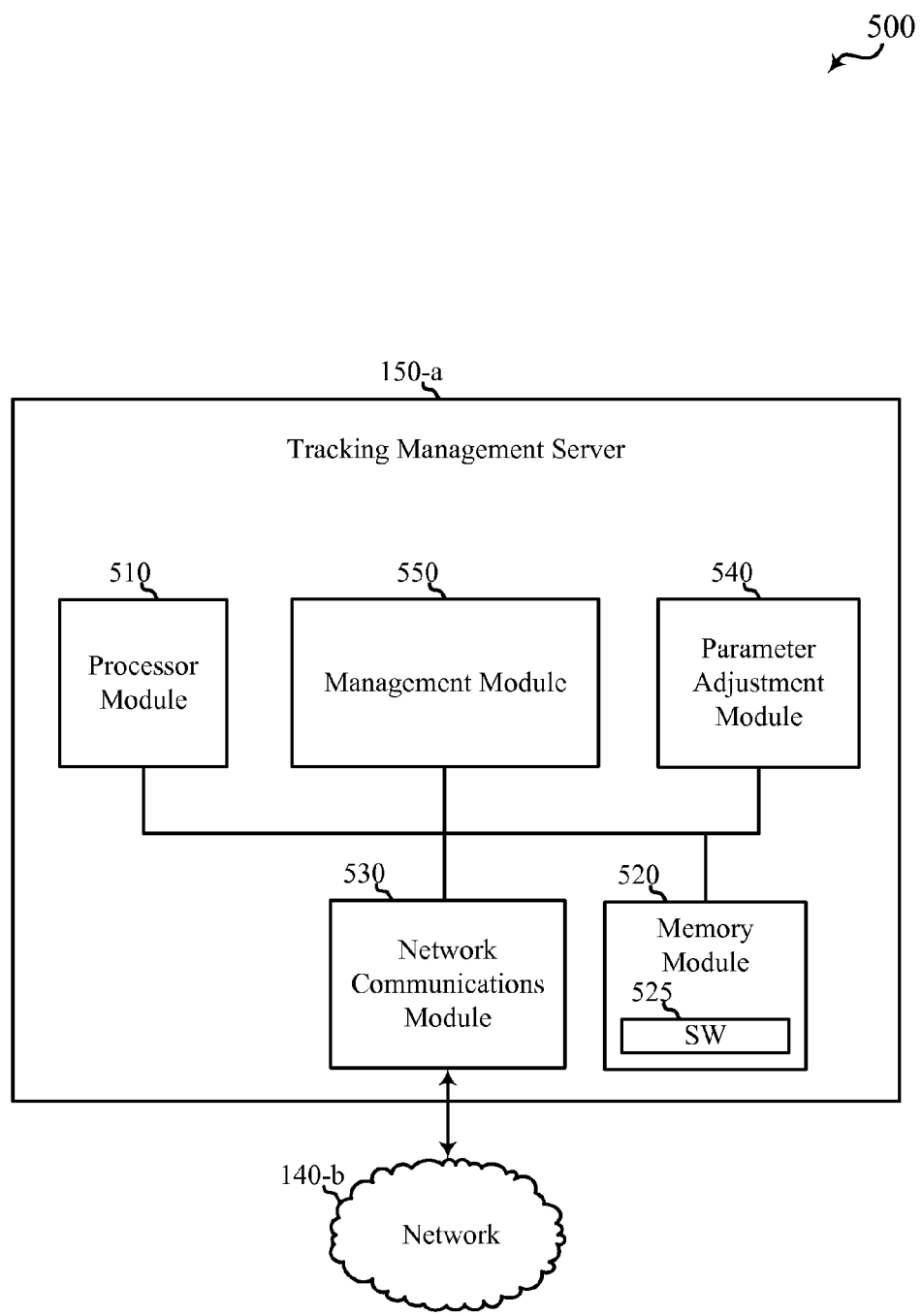
FIG. 5 shows a block diagram of an example of a location tracking system in accordance with various embodiments.

Referring next to FIG. 5, a system 500 is illustrated with a block diagram. The system 500 is configured for calibrating a position location network in accordance with various embodiments. In some embodiments, the system 500 includes a tracking management server 150-*a*, which may be the tracking management server 150 of FIGS. 1A and/or 1B. The tacking management server 150-*a* may include a processor module 510, a memory module 520, a network communications module 530, a parameter adjustment module 540, and/or management module 550. The management module 550 may be configured to perform calibration, synchronization, coordinate determination, filter determination, channel estimation, and/or tag update mode adjustments. In some embodiments, the management module determines or selects a master AP.

The processor module 510 may also perform various operations and may include an intelligent hardware device, e.g., a CPU. In some embodiments, the processor module 510 performs various operations associated with calibrating a position location network. For example, the processor module 510 may calculate a location of a tag unit 115 based on the locations of surrounding APs 105 as well as the distances between the tag unit 115 and at least three APs 105. In some cases, the processor module 510 determines the two closest APs 105, with previously determined coordinates, to use to determine the location of an AP 105. The tracking management server 150-a also may communicate with a network 140-b through the network communications module 530 to receive information from the APs 105 and/or to send information to the APs 105. The network 140-b may be an example of the networks 140 of any or all of FIGS. 1A, 1B, and 3.

The memory module 520 may include RAM and/or ROM. In some embodiments, the memory module 520 stores computer-readable, computer-executable software code 525 containing instructions that are configured to, when executed, cause the processor module 510 to perform various functions described herein. In other embodiments, the software code 525 may not be directly executable by the processor module 510; but the software code module may be configured to cause a computer, e.g., when compiled and executed, to perform functions described herein. The memory module 520 may include a database to store determined coordinate sets comprising coordinates of various APs 105 and/or tag units 115.

The management module 550, may perform various operations and may include an intelligent hardware device, e.g., a CPU. In some embodiments, the management module 550 updates the memory module 520 with current location values for devices, such as APs 105 and/or tag units 115. The management module 550 may include a database to store determined coordinate sets comprising coordinates of various APs 105 and/or tag units 115. Additionally or alternatively, the management module 550 may calibrate a position location network. For example, the management module 550 may identify a number of APs 105. In some embodiments, it also defines a coordinate system. By way of illustration, the management module 550 may an origin at a first AP 105; and it may define a set of axes extending from the defined origin. Further, an axis, such as an x-axis, may be defined as running from the origin, or the first AP 105, through a second AP 105. The second AP 105 may thus be defined to be located at a position along the x-axis, such as at (x, 0), where x is a distance to be determined. Once a coordinate system is defined, and once an orientation of the second AP 105 is defined with respect to the first AP 105, the management module 550 may calculate a coordinate set that includes coordinates for other APs 105 within the position location network.

In some cases, the management module 550 receives distances between APs 105 that have been calculated by ranging operations of the respective APs 105. For example, a first distance may be calculated by a ranging operation between two APs 105. One of the APs 105 may transmit the distance to the tracking management server 150-a, via the network 140-b. The distance may be received by the network communicated module 530 and transmitted to the management module 550.

Figure 6A:
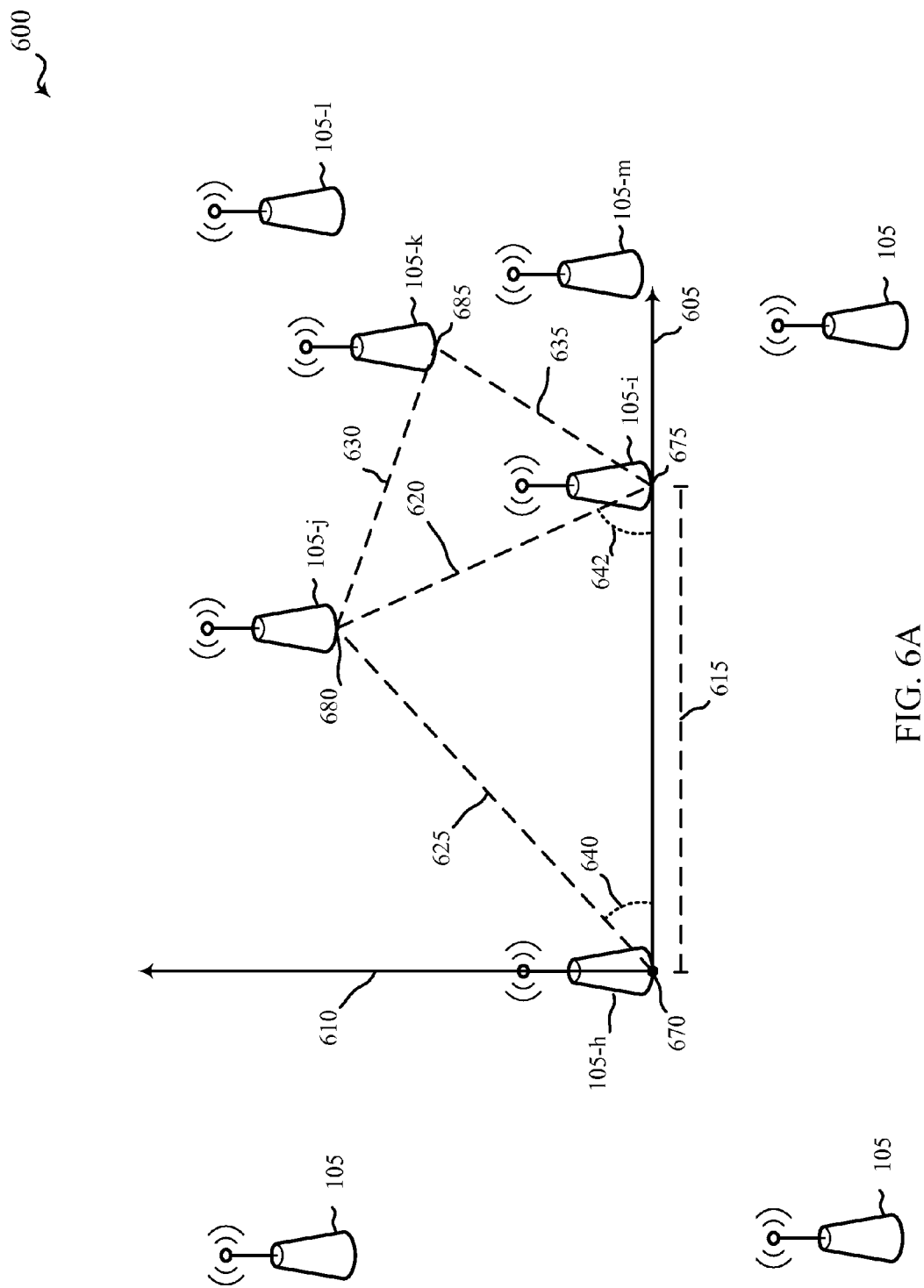
FIGS. 6A and 6B depict an example or examples of aspects of a location tracking system in accordance with various embodiments.

Turning now to FIG. 6A, which depicts a two-dimensional representation of APs 105 within a position location system 600. The system 600 includes numerous APs 105, specifically at least a first AP 105-h, a second AP 105-i, and a third AP 105-j. In some embodiments, the system 600 includes more APs such as a fourth AP 105-k. The location 670 of the first AP 105-h may be designated as the origin of a coordinate set. In some embodiments, the coordinate set is a Cartesian coordinate set comprising an x-axis 605 and a y-axis 610. An orientation may be determined between the location 670 of the first AP 105-h and a location 675 of the second AP 105-i. The orientation determination includes designating, in this example, the x-axis 605 as running through the location 675 of the second AP 105-i. A first distance 615 may be calculated between the first AP 105-h and the second AP 105-i. With the established orientation and the first distance 615 known, the location of the second AP 105-i may be determined, for example, as $(d_1, 0)$ where $d_1$ is the first distance 615.

Based on the locations 670, 675 of the first two APs 105-h, 105-i, locations 680, 685 of subsequent APs 105-j, 105-k may also be calculated. In some cases, to determine the location 680 of the third AP 105-j, a second distance 620 between the second AP 105-i and the third AP 105-j, and a third distance 625 between the first AP 105-h and the third AP 105-j are needed. Two of the angles 640, 642 of the triangle formed by the three APs 105-h, 105-i, 105-j may be calculated as $$d_2^2 = d_1^2 + d_3^2 - 2d_1 d_3 \cos \alpha \tag{1}$$

$$d_3^2 = d_1^2 + d_2^2 - 2d_1 d_2 \cos \beta \tag{2}$$

where $d_1$ is the first distance 615, $d_2$ is the second distance 620, $d_3$ is the third distance 625, $\alpha$ is the first angle 640, and $\beta$ is the second angle 642. If m is defined as the slope of the line between the first AP 105-h and the second AP 105-i, then $$m = \frac{b_2 - b_1}{a_2 - a_1}, \tag{3}$$

where $a_1$ is the x-coordinate of the first AP 105-h, $a_2$ is the x-coordinate of the second AP 105-i, $b_1$ is the y-coordinate of the first AP 105-h, and $b_2$ is the y-coordinate of the second AP 105-i. Therefore, if $m_1$ represents the slope of the line between the first AP 105-h and the third AP 105-j, and if $m_2$ represents the slope of the line between the second AP 105-i and the third AP 105-j, then it can be shown that $$m_1 = \frac{\tan\alpha + m}{1 - m\tan\alpha} \tag{4}$$

$$m_2 = \frac{m - \tan\beta}{1 + m\tan\beta}. \tag{5}$$

The equations of the line AC, which represents a line between the first AP 105-h and the third AP 105-j, and BC, which represents a line between the second AP 105-i and the third AP 105-j can respectively be written as $$y - b_1 = m_1(x - a_1) \tag{6}$$

$$y - b_2 = m_2(x - a_2). \tag{7}$$

Therefore, the coordinates of the location 680 of the third AP 105-j can be rewritten as $$x = \frac{b_2 + a_1 m_1 - b_1 - a_2 m_2}{m_1 - m_2} \tag{8}$$

$$y = \frac{a_1 m_1 m_2 + b_2 m_1 - a_2 m_1 m_2 - b_1 m_2}{m_1 - m_2}. \tag{9}$$

Subsequent APs 105 may iteratively use the two closest APs 105 as references when determining coordinates. In some cases, the two closest APs 105 must have previously determined coordinates in order to be used by subsequent APs 105. For example, once the locations of the first three APs 105-$h$, 105-$i$, 105-$j$ have been determined the location of the fourth AP 105-$k$ may be determined using the two APs 105 nearest AP 105-$k$. Some APs 105-$l$, 105-$m$ may be the closest APs to the fourth AP 105-$k$, but have not yet had coordinates determined. In this case, the fourth AP 105-$k$ may use the second 105-$i$ and third APs 105-$j$ to determine its coordinates since they are the closest APs 105 with determined coordinates. The fourth AP 105-$k$ may use a fourth distance 630 from the fourth AP 105-$k$ to one of the closest neighbor APs 105-$j$ and a fifth distance 635 from the fourth AP 105-$k$ to the other closest neighbor AP 105-$i$ to determine a coordinate location. After an orientation has been established and initial coordinates have been determined, subsequent coordinates may be iteratively determined in this manner, by using ranging operations with the two closest APs that have determined coordinates.

Figure 6B:
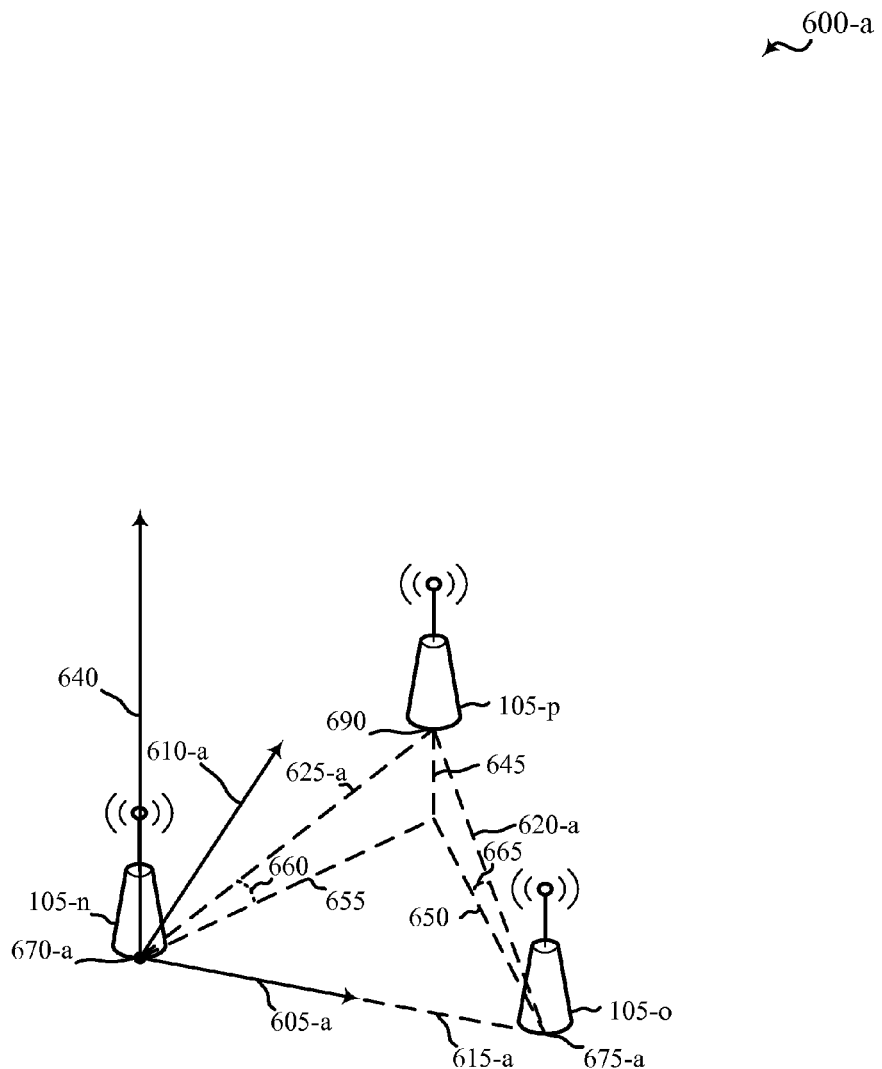

Next, FIG. 6B shows a three-dimensional representation of a system 600-$a$ similar to the system 600 from FIG. 6A. The system 600-$a$ includes a z-axis 640, as well as an x-605-$a$ and y-axis 610-$a$, which may be similar to or the same as the x-axis 605 and the y-axis 610 from FIG. 6A. Similar calculations as those described above may be used to determine the location of the fifth AP 105-$p$, although new parameters may be introduced. A z-axis displacement 645 may be used to determine the elevation or height difference between the other two APs. Further, the angle of incline 660 between the first AP 105-$n$ and the fifth AP 105-$p$ may be used to calculate the location 690 of the fifth AP 105-$p$. It should be noted that the third distance 625-$a$ in this example includes a change in elevation, and has a planar third distance 655 that lies in the x-y plane. Similarly, the second distance 620-$a$ includes a change in elevation and has a planar second distance 650 that lies in the x-y plane. In some embodiments, the z-axis displacement 645 is known, such as the difference between a first floor and a second floor in a shopping mall. In some cases, the z-axis displacement is calculated, such as based on a difference in elevation. In another embodiment, the z-axis displacement is calculated based on a determined angle of incline 660, 665 and the determined third distance 625-$a$ and/or the determined second distance 620-$a$.

Figure 7:
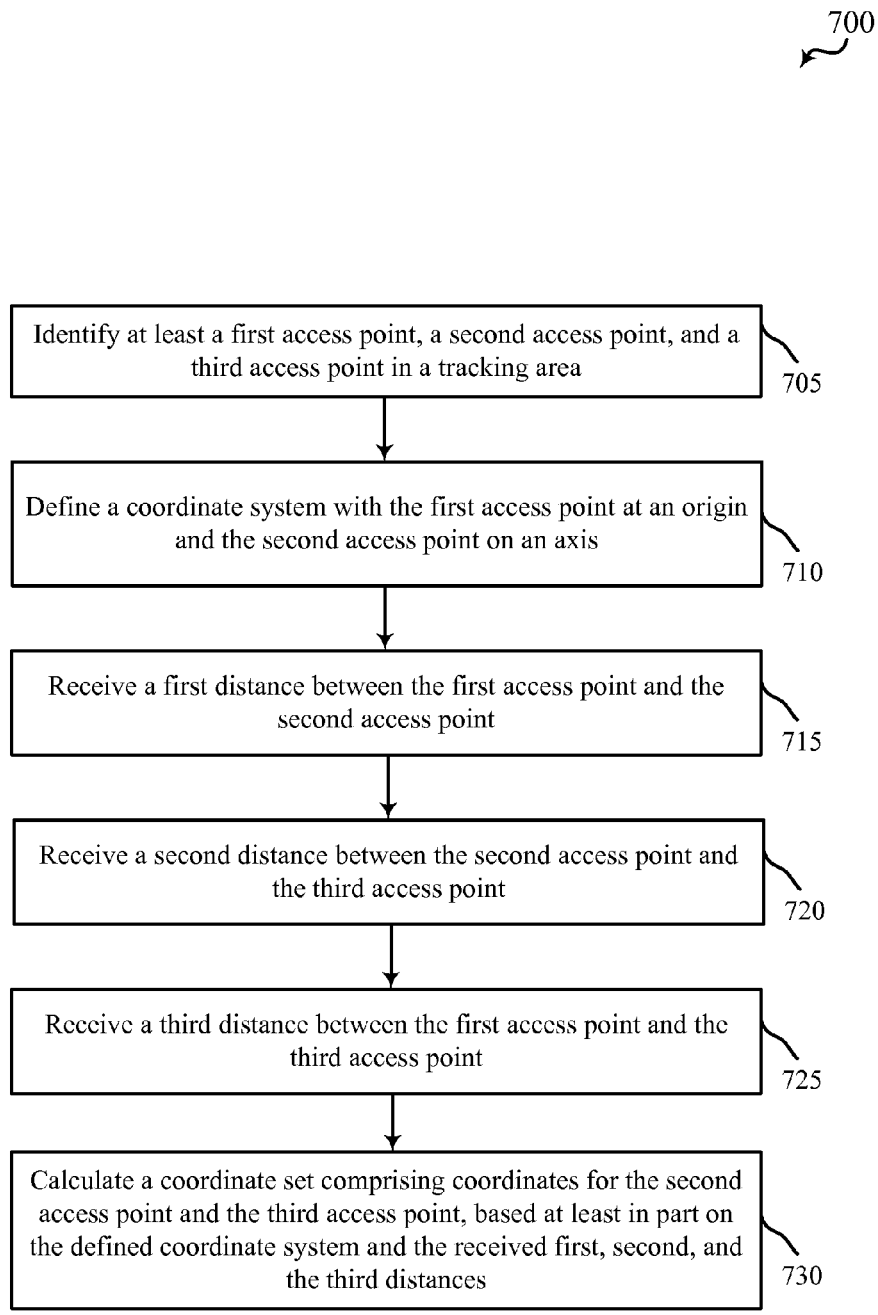
FIGS. 7, 8, and 9 are flow diagrams depicting a method or methods for determining coordinates of access points in a location tracking system in accordance with various embodiments.

Next, FIG. 7 shows a flow diagram, which illustrates a method 700 of determining coordinates of access points within a position location network, according to some embodiments. By way of illustration, the method 700 is implemented using the one or more of the devices and systems 100, 200-$a$, 200-$b$, 300, 400, and 500 of FIGS. 1A, 1B, 2A, 2B, 3, 4, and 5.

At block 705, a tag 115, an AP 105, and/or a tracking management server 150, may identify at least a first AP 105, a second AP 105, and a third AP 105 in a tracking area. At block 710, a tag 115, an AP 105, and/or a tracking management server 150, may define a coordinate system with the first AP at the origin and the second AP on an axis. At block 715, an AP 105 and/or a tracking management server 150 may receive a first distance between the first AP 105 and the second AP 105. An AP 105 and/or tracking management server 150 may then, at block 720, receive a second distance between the second AP 105 and the third AP 105. At block 725, an AP 105 and/or tracking management server 150 may receive a third distance between the first AP 105 and the third AP 105. Upon defining a coordinate system, and receiving a first, second, and third distances, an AP 105 and/or the tracking management server 150, at block 730, may calculate a coordinate set comprising coordinates for the second access point and the third access point, based at least in part on the defined coordinate system and the received first, second, and the third distances.

Those skilled in the art will recognize that the method 700 is but one implementation of the tools and techniques discussed herein. The operations of the method 700 may be rearranged or otherwise modified such that other implementations are possible.

Figure 8:
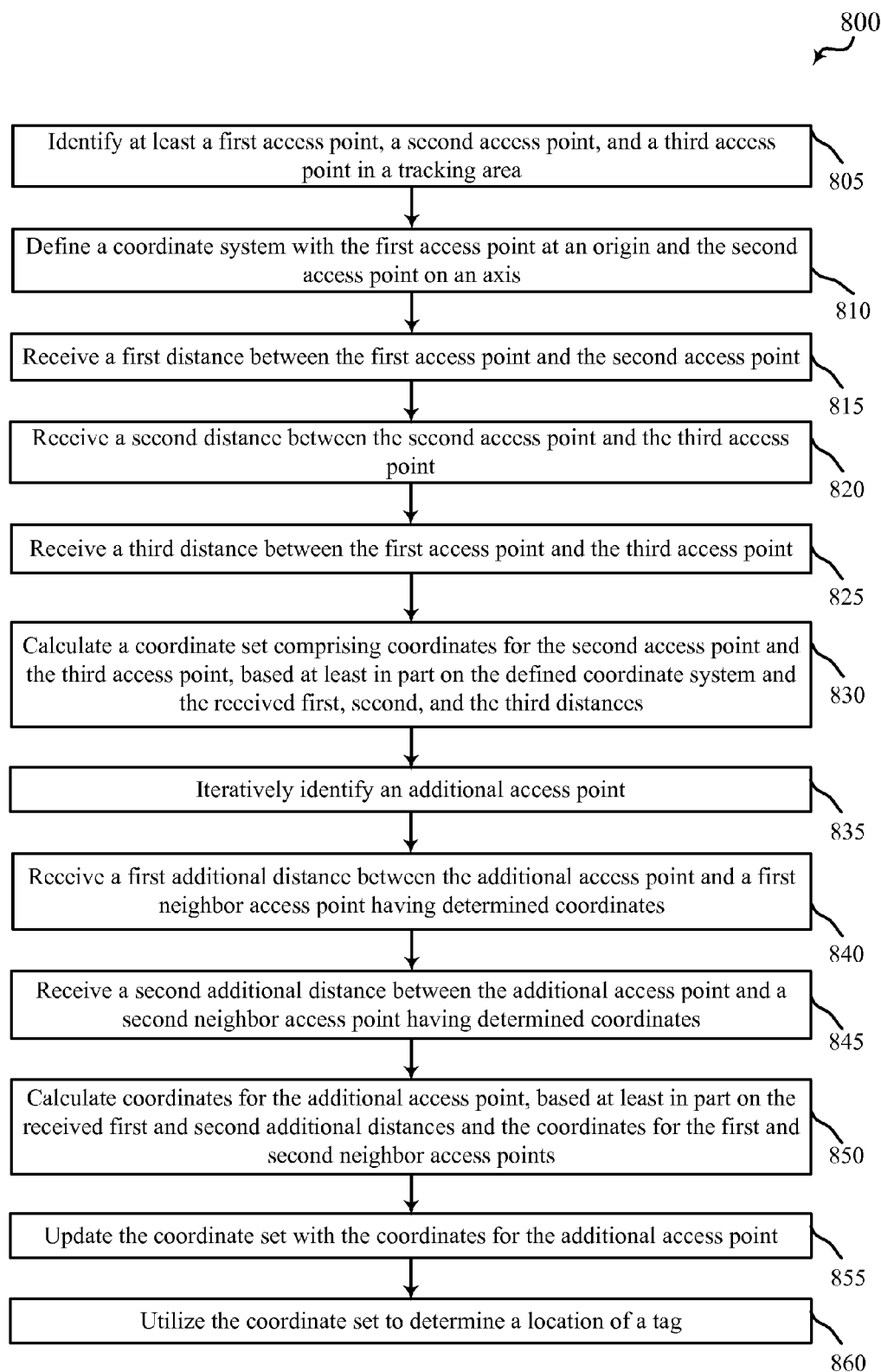

FIG. 8 shows a flow diagram that illustrates a method 800 for determining coordinates of access points within a position location network, according to various embodiments. The method 800 may be implemented using, for example, the devices and systems 100, 200-$a$, 200-$b$, 300, 400, and 500 of FIGS. 1A, 1B, 2A, 2B, 3, 4, and 5.

At block 805, a tag 115, an AP 105, and/or a tracking management server 150, may identify at least a first AP 105, a second AP 105, and a third AP 105 in a tracking area. At block 810, a tag 115, an AP 105, and/or a tracking management server 150, may define a coordinate system with the first AP at the origin and the second AP on an axis. At block 815, an AP 105 and/or a tracking management server 150 may receive a first distance between the first AP 105 and the second AP 105. An AP 105 and/or tracking management server 150 may then, at block 820, receive a second distance between the second AP 105 and the third AP 105. At block 825, an AP 105 and/or tracking management server 150 may receive a third distance between the first AP 105 and the third AP 105. Upon defining a coordinate system, and receiving a first, second, and third distances, an AP 105 and/or the tracking management server 150, at block 830, may calculate a coordinate set comprising coordinates for the second access point and the third access point, based at least in part on the defined coordinate system and the received first, second, and the third distances. At block 835, a tag 115, an AP 105, and/or tracking management server 150 may iteratively identify an additional AP 105. At block 840, an AP 105 and/or tracking management server 150 may receive a first additional distance between the additional AP 105 and a first neighbor AP 105 having determined coordinates. At block 845, an AP 105 and/or tracking management server 150 may receive a second additional distance between the additional AP 105 and a second neighbor AP 105 having determined coordinates. An AP 105 and/or tracking management server, at block 850, may calculate coordinates for the additional AP 105, based at least in part on the received first and second additional distances and the coordinates for the first and second neighbor APs 105. At block 855, an AP 105 and/or tracking management server 150 may update the coordinate set with the coordinates for the additional AP 105. At block 860, a tag 115, an AP 105, and/or tracking management server 150 may utilize the coordinate set to determine a location of a tag 115.

A skilled artisan will notice that the method 800 illustrates one implementation of the tools and techniques described herein. The operations of the method 800 may be rearranged or otherwise modified such that other implementations are possible.

Figure 9:
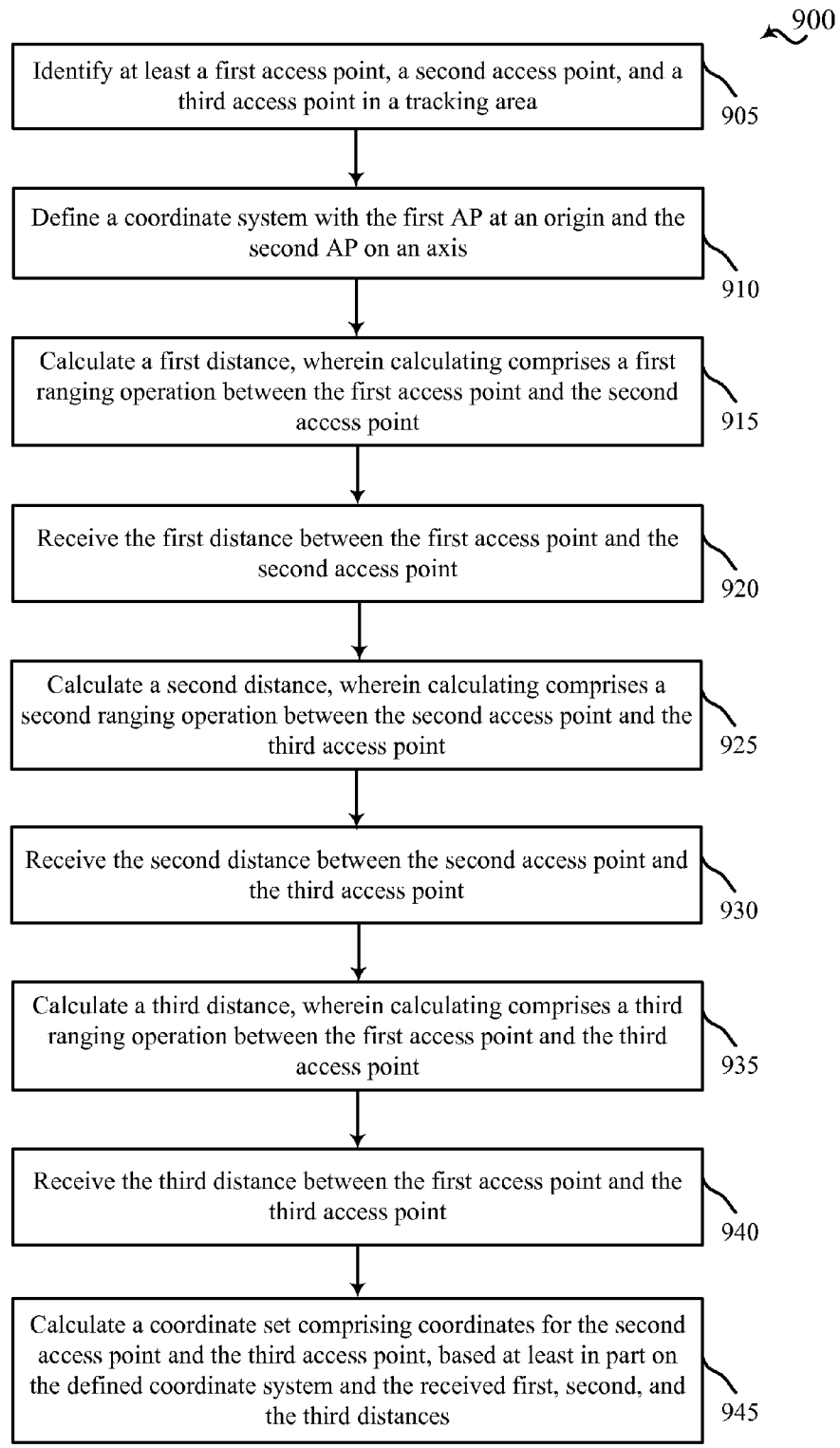

Turning to FIG. 9, which shows a flow diagram that illustrates a method 900 for calibrating a position location network, according to some embodiments. In some cases, the method 900 may be implemented using some or all of the devices and systems 100, 200-$a$, 200-$b$, 300, 400, and 500 of FIGS. 1A, 1B, 2A, 2B, 3, 4, and 5.

At block 905, a tag 115, an AP 105, and/or a tracking management server 150, may identify at least a first AP 105, a second AP 105, and a third AP 105 in a tracking area. At block 910, a tag 115, an AP 105, and/or a tracking management server 150, may define a coordinate system with the first AP at the origin and the second AP on an axis. At block 915, an AP 105 and/or a tracking management server 150 may calculate a first distance, wherein calculating comprises a first ranging operation between the first AP 105 and the second AP 105. At block 920, an AP 105 and/or a tracking management server 150 may receive the first distance between the first AP 105 and the second AP 105. An AP 105 and/or tracking management server 150 may then, at block 925, calculate a second distance, wherein calculating comprises a second ranging operation between the second AP 105 and the third AP 105. At block 930, an AP 105 and/or tracking management server 150 may receive the second distance between the second AP 105 and the third AP 105. At block 935, an AP 105 and/or tracking management server 150 may calculate a third distance, wherein calculating comprises a third ranging operation between the first AP 105 and the third AP 105. At block 940, an AP 105 and/or tracking management server 150 may receive the third distance between the first AP 105 and the third AP 105. Upon defining a coordinate system, and receiving a first, second, and third distances, an AP 105 and/or the tracking management server 150, at block 945, may calculate a coordinate set comprising coordinates for the second access point and the third access point, based at least in part on the defined coordinate system and the received first, second, and the third distances.

One skilled in the art will recognize that the method 900 is just one implementation of the tools and techniques described herein. The operations of the method 900 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of calibrating a position location network, comprising:
identifying, by a management server, at least a first access point (AP), a second AP, and a third AP in a tracking area;
defining, by the management server, a coordinate system with the first AP at an origin and the second AP on an axis;
receiving, by the management server, from the first AP, a first distance between the first AP and the second AP;
receiving, by the management server, from the second AP, a second distance between the second AP and the third AP;

receiving, by the management server, from the third AP, a third distance between the first AP and the third AP;

calculating, by the management server, a coordinate set comprising coordinates for the second AP and the third AP, the coordinate set being based on the defined coordinate system and the received first, second, and the third distances.

2. The method of claim 1, further comprising:

iteratively identifying, by the management server, an additional AP;

receiving, by the management server, from the additional AP, a first additional distance between the additional AP and a first neighbor AP having determined coordinates;

receiving, by the management server, from a second neighbor AP, a second additional distance between the additional AP and a second neighbor AP having determined coordinates; and calculating, by the management server, coordinates for the additional AP, the coordinates for the additional AP being based on the received first and second additional distances and the coordinates for the first and second neighbor APs.

3. The method of claim 2, further comprising:

updating the coordinate set with the coordinates for the additional AP.

4. The method of claim 3, further comprising:

utilizing the coordinate set to determine a location of a tag.

5. The method of claim 2, wherein the first and second neighbor APs comprise two APs nearest the additional AP.

6. The method of claim 1, wherein the coordinates are rectangular coordinates.

7. The method of claim 1, wherein the coordinates are cubic coordinates.

8. A system configured for calibrating a position location network, the system comprising:

means for identifying, by a management server, at least a first access point (AP), a second AP, and a third AP in a tracking area;

means for defining, by the management server, a coordinate system with the first AP at an origin and the second AP on an axis;

means for receiving, by the management server, from the first AP, a first distance between the first AP and the second AP;

means for receiving, by the management server, from the second AP, a second distance between the second AP and the third AP;

means for receiving, by the management server, from the third AP, a third distance between the first AP and the third AP;

means for calculating, by the management server, a coordinate set comprising coordinates for the second AP and the third AP, the coordinate set being based on the defined coordinate system and the received first, second, and third distances.

9. The system of claim 8, further comprising:

means for iteratively identifying, by the management server, an additional AP;

means for receiving, by the management server, from the additional AP, a first additional distance between the additional AP and a first neighbor AP having determined coordinates;

means for receiving, by the management server, from a second neighbor AP, a second additional distance between the additional AP and a second neighbor AP having determined coordinates; and means for calculating, by the management server, coordinates for the additional AP, the coordinates for the additional AP being based on the received first and second additional distances and the coordinates for the first and second neighbor APs.

10. The system of claim 9, wherein the first and second neighbor APs comprise two APs nearest the additional AP.

11. The system of claim 8, wherein the coordinates are rectangular coordinates.

12. The system of claim 8, wherein the coordinates are cubic coordinates.

13. An apparatus for calibrating a position location network, the apparatus comprising:

a processor;

memory in electronic communication with the processor; and instructions stored in the memory, the instructions being executable by the processor to:

identify, by a management server, at least a first access point (AP), a second AP, and a third AP in a tracking area;

define, by the management server, a coordinate system with the first AP at an origin and the second AP on an axis;

receive, by the management server, from the first AP, a first distance between the first AP and the second AP;

receive, by the management server, from the second AP, a second distance between the second AP and the third AP;

receive, by the management server, from the third AP, a third distance between the first AP and the third AP;

calculate, by the management server, a coordinate set comprising coordinates for the second AP and the third AP, the coordinate set being based on the defined coordinate system and the received first, second, and third distances.

14. The apparatus of claim 13, wherein the instructions are further executable by the processor to:

iteratively identify, by the management server, an additional AP;

receive, by the management server, from the additional AP, a first additional distance between the additional AP and a first neighbor AP having determined coordinates;

receive, by the management server, from a second neighbor AP, a second additional distance between the additional AP and a second neighbor AP having determined coordinates; and calculate, by the management server, coordinates for the additional AP, the coordinates for the additional AP being based on the received first and second additional distances and the coordinates for the first and second neighbor APs.

15. The apparatus of claim 14, wherein the first and second neighbor APs comprise two APs nearest the additional AP.

16. The apparatus of claim 13, wherein the coordinates are rectangular coordinates.

17. The apparatus of claim 13, wherein the coordinates are cubic coordinates.

18. A non-transitory computer-program product for calibrating a position location network, the non-transitory computer-program product comprising a non-transitory computer-readable medium storing instructions executable by a processor to:

identify, by a management server, at least a first access point (AP), a second AP, and a third AP in a tracking area;

define, by the management server, a coordinate system with the first AP at an origin and the second AP on an axis;

receive, by the management server, from the first AP, a first distance between the first AP and the second AP;

receive, by the management server, from the second AP, a second distance between the second AP and the third AP;

receive, by the management server, from the third AP, a third distance between the first AP and the third AP;

calculate, by the management server, a coordinate set comprising coordinates for the second AP and the third AP, the coordinate set being based on the defined coordinate system and the received first, second, and third distances.

19. The non-transitory computer-program product of claim 18, wherein the instructions are further executable by the processor to:

iteratively identify, by the management server, an additional AP;

receive, by the management server, from the additional AP, a first additional distance between the additional AP and a first neighbor AP having determined coordinates;

receive, by the management server, from a second neighbor AP, a second additional distance between the additional AP and a second neighbor AP having determined coordinates; and calculate, by the management server, coordinates for the additional AP, the coordinates for the additional AP being based on the received first and second additional distances and the coordinates for the first and second neighbor APs.

20. The non-transitory computer-program product of claim 19, wherein the first and second neighbor APs comprise two APs nearest the additional AP.

21. The non-transitory computer-program product of claim 18, wherein the coordinates are rectangular coordinates.

22. The non-transitory computer-program product of claim 18, wherein the coordinates are cubic coordinates.

* * * * *